United States Patent
Pircher et al.

(10) Patent No.: US 9,436,665 B2
(45) Date of Patent: Sep. 6, 2016

(54) SYNCHRONIZING ANNOTATIONS BETWEEN PRINTED DOCUMENTS AND ELECTRONIC DOCUMENTS

(71) Applicant: Thomson Reuters Global Resources (TRGR), Baar (CH)

(72) Inventors: Peter Pircher, Baar (CH); Jochen Lothar Leidner, Zug (CH); Aaron Cooper, Cologne, MN (US); Daniel Dabney, Baar (CH); Jonathan Medin, Oberwil bei Zug (CH); Jack G. Conrad, Hunenberg (CH)

(73) Assignee: THOMSON REUTERS GLOBAL RESOURCES, Baar (CH)

( * ) Notice: Subject to any disclaimer, the term of this patent is extended or adjusted under 35 U.S.C. 154(b) by 420 days.

(21) Appl. No.: 13/781,446

(22) Filed: Feb. 28, 2013

(65) Prior Publication Data
US 2014/0245123 A1    Aug. 28, 2014

(51) Int. Cl.
G06F 17/20 (2006.01)
G06F 17/24 (2006.01)
G06F 17/22 (2006.01)

(52) U.S. Cl.
CPC ......... *G06F 17/241* (2013.01); *G06F 17/2247* (2013.01); *G06F 17/242* (2013.01)

(58) Field of Classification Search
CPC . G06F 17/241; G06F 17/242; G06F 17/2247
See application file for complete search history.

(56) References Cited

U.S. PATENT DOCUMENTS

| | | | |
|---|---|---|---|
| 7,111,230 B2 | 9/2006 | Euchner et al. | |
| 2006/0291727 A1* | 12/2006 | Bargeron | G06Q 10/10 382/218 |
| 2007/0277093 A1 | 11/2007 | Joshi et al. | |
| 2008/0114782 A1* | 5/2008 | Sadovsky | G06F 17/30014 |
| 2008/0222512 A1* | 9/2008 | Albornoz | G06F 17/30011 715/230 |
| 2010/0278453 A1* | 11/2010 | King | G06Q 10/10 382/321 |
| 2011/0098056 A1* | 4/2011 | Rhoads | G01C 21/20 455/456.1 |
| 2011/0215161 A1 | 9/2011 | Jung et al. | |
| 2011/0280447 A1 | 11/2011 | Conwell | |

OTHER PUBLICATIONS

Philipp Lenssen, "Amazon's Mechanical Turk," (Nov. 6, 2005) [retrieved on Mar. 13, 2015] available at http://blogoscoped.com/archive/2005-11-04-n69.html.*

(Continued)

*Primary Examiner* — Stephen Hong
*Assistant Examiner* — Shahid Khan
(74) *Attorney, Agent, or Firm* — Faegre Baker Daniels LLP (57) ABSTRACT

An image of a printed document portion is provided to a synchronizer. The synchronizer retrieves an electronic version of the printed document and identifies an electronic text portion that is textually similar to a printed text portion. The synchronizer detects an annotation in the printed document portion and inserts a corresponding digital annotation into the electronic document.

18 Claims, 5 Drawing Sheets

(56) References Cited

OTHER PUBLICATIONS

Crochemore, Maxime et al., "Gapped Suffix Arrays: a New Index Structure for Fast Approximate Matching," SPIRE'10 Proceedings of the 17th international conference on String processing and information retrieval, pp. 359-364, Springer-Verlag Berlin, Heidelberg 2010.

Banerjee, Purnendu et al., "A System for Hand-Written and Machine-Printed Text Separation in Bangla Document Images," 2012 International Conference on Frontiers in Handwriting Recognition, 2012 IEEE.

Koehn, Philipp et al., "Fast Approximate String Matching with Suffix Arrays and A* Parsing," AMTA Conference 2010.

Hoffelder, Nate, "The Digital Reader, Charting the eBook Evolution since 2010," http://www.the-digital-reader.com/2012/08/24/evernote.

"Notification of Transmittal of the International Search Report and the Written Opinion of the International Searching Authority, or the Declaration". International Application No. PCT/US14/18903. 19 pages. International Filing Date: Feb. 27, 2014. Mailing Date: Jul. 11, 2014.

* cited by examiner

SYNCHRONIZING ANNOTATIONS BETWEEN PRINTED DOCUMENTS AND ELECTRONIC DOCUMENTS

BACKGROUND

The popularity of e-books and other electronic documents has increased among readers such as legal practitioners, medical practitioners, students, and others in recent years. Some of these readers maintain a printed version of a document as well as an electronic version of the document. Many readers have grown accustomed to annotating printed documents by highlighting and underlining portions of text, writing notes in the margins, writing notes between lines of printed text, crossing out printed text, and the like. While conventional e-books and other electronic documents sometimes allow for digital annotations to be added directly via a reading device, a reader often must continue to refer to a printed version of a document that he or she has initially annotated, as these electronic document platforms do not enable synchronization of annotations between a printed document and an electronic version of the printed document.

SUMMARY

Embodiments of the present invention disclosed herein facilitate synchronization of annotations between a printed document and an electronic document. In embodiments, an image of a portion of a printed document is provided to a synchronizer. The synchronizer may retrieve an electronic version of the printed document and identify an electronic text portion that is textually similar to a printed text portion. According to embodiments, the synchronizer detects an annotation in the portion of the printed document and inserts a corresponding digital annotation in the identified textually similar portion of the electronic document.

While the present invention is amenable to various modifications and alternative forms, specific embodiments have been shown by way of example in the drawings and are described in detail below. The present invention, however, is not limited to the particular embodiments described. On the contrary, the present invention is intended to cover all modifications, equivalents, and alternatives falling within the ambit of the present invention as defined by the appended claims.

Although the term "block" may be used herein to connote different elements of illustrative methods employed, the term should not be interpreted as implying any requirement of, or particular order among or between, various steps disclosed herein unless and except when explicitly referring to the order of individual steps.

DETAILED DESCRIPTION

In embodiments, a reader such as a student, doctor, or attorney, may wish to maintain both a printed version of a document and an electronic version of the document, or to begin using only an electronic version of a document after having used the printed version. The printed document may include any number of annotations such as, for example, highlights, underlines, handwritten notes, flags, and the like, that the reader may wish to have available in the electronic version of the document. Embodiments of the present invention include a synchronizer that facilitates synchronization of annotations such as these between the printed document and the electronic version so that the annotations may be available to the reader in the electronic version of the document. For example, the reader may create images of annotated portions of the printed document (e.g., using a camera or scanner) and provide those images to the synchronizer, or the reader may provide the printed document to a scanning service (which may, in embodiments, be associated with the synchronizer). The scanning service may use a scanning device to create images of the annotated portions of the printed document and provide the resulting images to the synchronizer. Additionally, in embodiments, the synchronizer may facilitate navigation of an electronic version of a printed document such as, for example, to facilitate direct insertion, by the reader, of digital annotations into the electronic version. For example, a reader may provide an image of a portion of the printed document to the synchronizer, which uses the image to locate and display a corresponding portion of the electronic document, into which the reader may directly insert a digital annotation.

Figure 1:
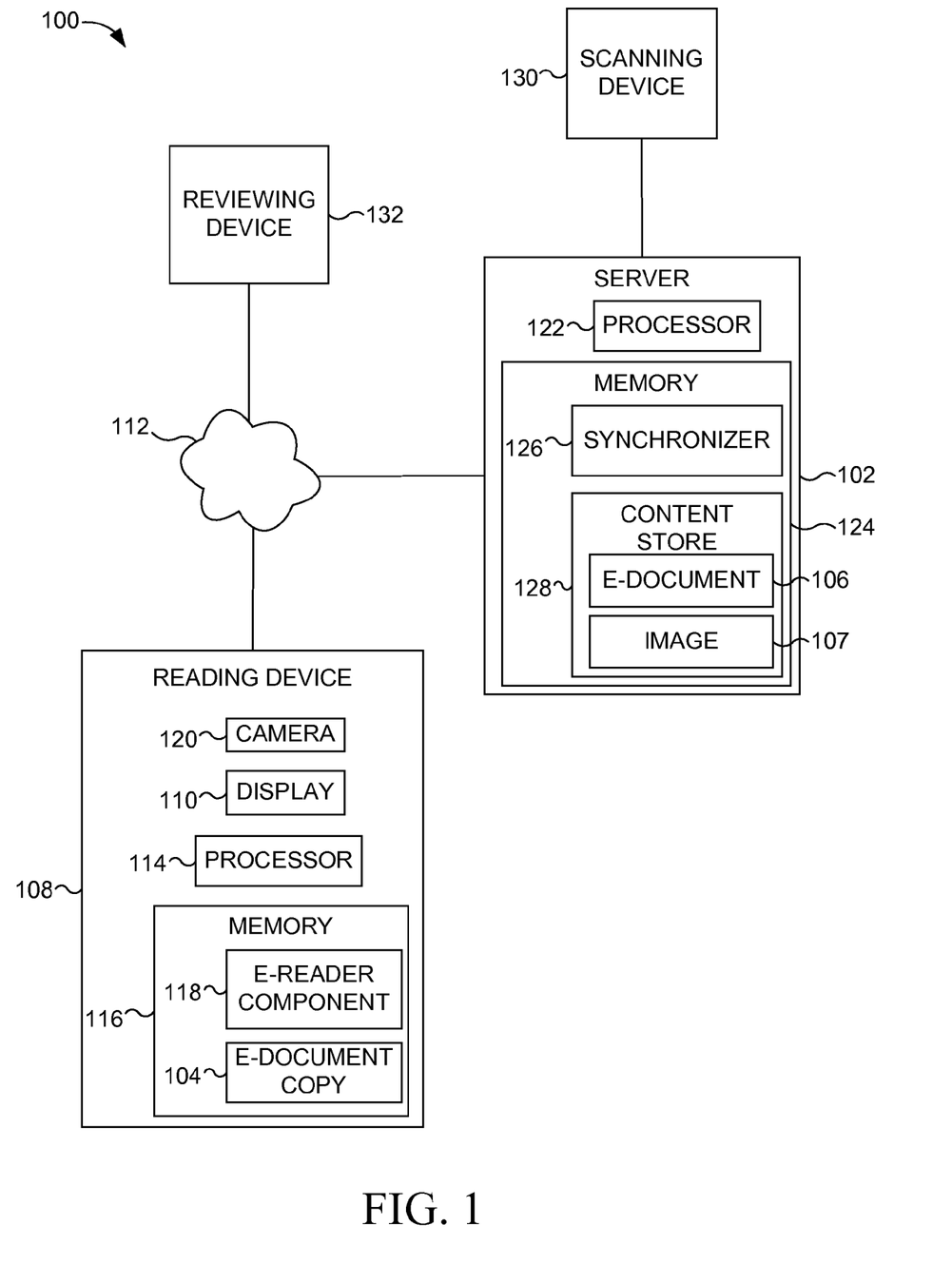
FIG. 1 is a block diagram illustrating an operating environment (and, in some embodiments, aspects of the present invention) in accordance with embodiments of the present invention.

FIG. 1 depicts an illustrative operating environment 100 (and, in some embodiments, aspects of the present invention) in accordance with embodiments of the present invention as illustrated by way of example. As shown in FIG. 1, embodiments of the operating environment 100 include a server 102 that provides a copy 104 (labeled as "e-document copy") of an electronic document 106 (labeled as "e-document") to a reading device 108 and that hosts a synchronizer 126, described in more detail below. In embodiments, the synchronizer 126 may be hosted by the reading device 108 or other computing device and the server 102 may serve as just a repository for the electronic document 106.

As the name implies, the reading device 108 is, in embodiments, what the reader uses to read electronic documents and includes a display 110 upon which the copy 104 of the electronic document 106 may be displayed. In embodiments, the electronic document 106 and the copy 104 are electronic versions of a printed document (not shown) and may be in its original, non-annotated form or an annotated form. An electronic version of a printed document may include the same or substantially similar content as the printed document, but may also include different content. For example, an electronic version of a printed document may include an updated publication (e.g., edition) of the printed document, an annotated version of the printed document, and the like. Examples of documents (both printed and electronic) include books, articles, court decisions, collections of statutes, treatises, footnotes, reference notes, translation notes, and the like.

In embodiments, a user (not shown) downloads the copy 104 of the electronic document 106 by utilizing the reading device 108 to access the server 102 through a communications network 112 such as, for example, a local area network, an enterprise network, the Internet, or the like. The copy 104 of the electronic document 106 may also be provided to the reading device 108 via a removable memory device such as, for example, a compact disc, a flash drive, or the like. According to embodiments, the electronic document 106 (and copy 104 thereof) may be embodied in one or more files using any number of various formats such as, for example, DjVu, EPUB®, FictionBook Kindle®, Microsoft® Reader, eReader®, Plucker, plain text in ASCII, UNICODE, markup languages, a platform-independent document format such as portable document format (pdf), and the like. The electronic document 106 (and/or copy 104 thereof) may also be embodied in the Thomson Reuters ProView® format, available from Thomson Reuters of New York, N.Y. Examples of markup languages, and corresponding markup language files, include Hypertext Markup Language (HTML), Extensible Markup Language (XML), Extensible Hypertext Markup Language (XHTML), and the like.

As shown in FIG. 1, the reading device 108 includes a processor 114 and a memory 116. According to embodiments, the reading device 108 is a computing device and may, for example, take the form of a specialized computing device or a general-purpose computing device such as a personal computer, workstation, personal digital assistant (PDA), mobile telephone, smartphone, tablet, notebook, or the like. An e-reader component 118 is stored in the memory 116. In embodiments, the processor 114 executes the e-reader component 118, which may cause at least a portion of the copy 104 of the electronic document 106 to be displayed on the display 110. The e-reader component 118 also may facilitate other operations and interactions associated with the copy 104 such as, for example, inserting digital annotations, searching, bookmarking, and the like, as explained in greater detail below. In embodiments, the e-reader component 118 may access the server 102 to cause at least a portion of the electronic document 106 to be displayed on the display 110.

As shown in FIG. 1, the server 102 includes a processor 122 and a memory 124. The synchronizer 126 may be stored in the memory 124. In embodiments, the processor 122 executes the synchronizer 126, which may facilitate navigation of an electronic document (or a copy 104 thereof, e.g., by interacting with a reading device 108) and synchronization of annotations between a printed document and an electronic document 106 (and/or a copy 104 thereof). The electronic document 106 may be stored in a content store 128 in the memory 124. In embodiments, to facilitate synchronization of annotations, an image 107 of a portion of a printed document (referred to herein as a "printed document portion") is provided to the server 102, which may also store the image 107 in the content store 128.

According to embodiments, a printed document portion may include one or more annotations in proximity to a portion of printed text (referred to herein as a "printed text portion") and may be contained on one or more pages of one or more printed documents. Annotations may include, for example, highlights, underlines, handwritten notes in a margin or between lines of printed text, bookmarks, adhesive flags, and the like. A printed text portion may include, for example, one or more chapters; one or more paragraphs; one or more lines; one or more words; one or more characters; one or more parts of a chapter, paragraph, line, word, or character; or the like. Additionally, a printed text portion may include a passage of text and one or more corresponding footnotes, endnotes, figures, tables, or the like.

According to embodiments, the image 107 of the printed document portion may be created, for example, using a camera 120 integrated with the reading device 108 (e.g., where the reading device is a smartphone or tablet computer) and may be provided to the server 102 by way of the communications network 112. For example, a reader may use the camera 120 to photograph (i.e., create an image 107 of) an annotated portion of a printed document and communicate the image 107 to the server 102, along with a request that an electronic version 106 of the printed document be modified to include digital annotations corresponding to the annotations appearing in the image 107. The server 102 may respond to the request by inserting the digital annotations and providing a copy 104 of the electronic document 106, having the corresponding digital annotations, to the reading device 108, or by instructing the e-reader component 118 on the reading device 108 to insert the annotations.

In embodiments, the image 107 may also be created using a scanning device 130, such as an industrial scanner, or any other type of imaging device (not shown). For example, an individual or entity (e.g., a library, school, law firm, or the like) may provide annotated printed documents to a service provider associated with the server 102. The service provider may utilize an industrial scanner 130, for example, to scan large numbers of documents, entire books, or the like, and provide the images 107 created from the scanning process directly to the server 102. In embodiments, a scanning service may utilize a scanning device 130 and provide the resulting images 107 to the server 102 by way of the communications network 112.

According to embodiments, to facilitate synchronization of annotations, the synchronizer 126 retrieves, or otherwise accesses, at least a portion of the image 107 from the content store 128 and retrieves, or otherwise accesses, at least a portion of an electronic version (e.g., electronic document 106) of the printed document. The synchronizer 126 identifies a portion of electronic text (referred to herein as an "electronic text portion") in the electronic document 106 that corresponds to the printed text portion captured in the image 107. According to embodiments, an electronic text portion corresponds to a printed text portion if the two text portions are textually similar. Textual similarity may, for example, refer to a degree of similarity between two portions of text and may be defined, for example, in the context of statistical measures, ratios, or the like. For example, two text portions may be textually similar if they have a certain number (e.g., as compared with other, adjacent, text portions) of matching characters, character n-grams, or the like.

Additionally, in embodiments, the synchronizer 126 may be configured to analyze the image 107 to detect annotations in the printed document portion and may also be configured to interpret detected annotations. For example, the synchronizer 126 may detect an annotation within an image 107 of a printed document portion and may determine an annotation type (e.g., highlight, underline, and the like) of the detected annotation. According to embodiments, one or more reviewers may be utilized (e.g., via a crowd-sourcing model) to facilitate detection and/or interpretation of annotations, as well as creation, modification, and/or verification of digital annotations. For example, the server 102 may provide an image of a handwritten annotation to a reviewing device 132 (e.g., via the communications network 112) so that a reviewer may assist in creating the digital annotation by detecting, interpreting and/or transcribing the handwritten annotation into digital text, which may be searchable using the reading device 108. In embodiments, additional reviewers may verify the first reviewer's interpretations of the handwritten annotation. Crowd-sourcing platforms may be used to interact with reviewers and may include crowd-sourcing platforms integrated with the server 102 or independent platforms such as, for example, Amazon Mechanical Turk,® provided by Amazon.com,® Inc. of Seattle, Wash., U.S.A. Artificial intelligence algorithms may also be utilized to interpret, modify and/or verify digital annotations.

The synchronizer 126 may insert a digital annotation corresponding to the detected annotation into the electronic document 106, and, in embodiments, the e-reader component 118 may insert the digital annotation into the copy 104 of the electronic document 106. For example, the synchronizer 126 may provide an instruction to the e-reader component 118 that causes the e-reader component 118 to insert the digital annotation into the copy 104 of the electronic document 106. Examples of a digital annotation include, but are not limited to, an image of a detected annotation, electronic text, a formatting object (e.g., code causing a portion of rendered electronic text to include a highlight, an underline, or the like), an electronic bookmark, digital flag, a hyperlink, a set of instructions for modifying a portion of the electronic document 106 (or copy 104 thereof), and the like.

Embodiments of the present invention also may facilitate various operations for managing digital annotations. For example, the synchronizer 126, and/or the e-reader component 118, may be configured to remove a digital annotation from an electronic document 106 (or copy 104 thereof) that had previously been inserted during a synchronization process, and that is no longer found in the corresponding printed document. In addition, the synchronizer 126, and/or e-reader component 118, may be configured to distinguish between digital annotations that were inserted during a synchronization process (referred to herein as migrated digital annotations) and digital annotations that were added directly to the electronic document 106 (or copy 104 thereof) (referred to herein as direct digital annotations). In embodiments, a digital annotation may include an attribute that specifically indicates whether the digital annotation was inserted during a synchronization process or was added directly by a reader. The attribute may be represented by a value of a tag that is associated with the electronic document 106 and the synchronizer may determine whether the annotation is a migrated digital annotation or a direct digital annotation by determining the value of the tag. In this manner, embodiments of the present invention may facilitate removal of migrated digital annotations while minimizing unintentional removal of direct digital annotations.

Tag values may also be associated with particular annotation migrations. For example, a reader may place a first sticky note related to a first piece of content (e.g., a first legal case) in a printed document. When a first digital annotation, corresponding to the first sticky note, is inserted into an electronic version of the printed document, a tag value associated with the digital annotation may provide information about the instance of the migration. The tag value may, for example, indicate that the first digital annotation is related to the first case (e.g., where the reader can specify the tag value), was created at a particular time, or the like. Subsequently, the reader might remove the first sticky note from the printed document and replace it with a second sticky note related to a second piece of content (e.g., a second legal case). In embodiments, a second digital annotation, corresponding to the second sticky note, may also be inserted into the electronic document and may have an associated tag value indicating, for example, that it is related to the second legal case. The reader may be presented with an option for maintaining or removing the first digital annotation, customizing tag values associated with first and/or second digital annotations, or the like.

Embodiments of the invention also facilitate manipulation of digital annotations. For example, digital annotations may be stored as separate items attached to the electronic document that may be manipulated, or digital annotations may be integrated within the electronic document, which may be manipulated. Additionally, the synchronizer 126, and/or the e-reader component 118, may be configured to adjust the positions of digital annotations such that new digital annotations do not obscure existing digital annotations. In embodiments, the synchronizer 126, and/or the e-reader component 118 may allow a reader to search, manipulate, reposition, edit, delete, or otherwise manage digital annotations.

Embodiments of the present invention also may facilitate selective display of digital annotations. For example, if the copy 104 of the annotated electronic document 106 is used during a court session, it might be desirable to display a section of the copy 104 to opposing counsel, the judge, and/or the jury without displaying one or more digital annotations contained therein. Thus, the e-reader component 118 may include an option for hiding one or more digital annotations when the copy 104 is displayed. To facilitate this, a digital annotation may include a tag that allows for showing or hiding the digital annotation, based on the value of the tag. For example, a reader may specify that digital annotations having a certain tag value (e.g., digital annotations related to a first legal case, as discussed in the example above), are to be hidden. The value of the tag also may enable conditional formatting of a digital annotation. For example, the size, shape, file format, and/or layout of a digital annotation may be adjusted based on a value of the tag, which may be static or dynamic and may be assigned based on characteristics of nearby digital annotations, memory constraints, available screen area, reading device capabilities, or the like. Additionally, tag values may be generated manually or automatically. For example, the e-reader component 118 may assign a particular value to a tag, based on an event or condition, and the e-reader component 118 may cause a selectable option (e.g., a button or icon) to be presented on the display 110 so that, upon receiving a selection of the option, one or more annotations that may otherwise be displayed are not displayed.

According to embodiments, various components of the operating environment 100, illustrated in FIG. 1, can be implemented on one or more computing devices. For example, each of the server 102, the reading device 108, the scanning device 130, and the reviewing device 132 may be, or include, one or more computing devices. A computing device may include any type of computing device suitable for implementing embodiments of the invention. Examples of computing devices include "workstations," "servers," "laptops," "desktops," "tablet computers," "hand-held devices," "e-book readers," and the like, all of which are contemplated within the scope of FIG. 1 and reference to various components of the operating environment 100.

In embodiments, a computing device includes a bus that, directly and/or indirectly, couples the following devices: a processor, a memory, an input/output (I/O) port, an I/O component, and a power supply. Any number of additional components, different components, and/or combinations of components may also be included in the computing device. The bus represents what may be one or more busses (such as, for example, an address bus, data bus, or combination thereof). Similarly, in embodiments, the computing device may include a number of processors, a number of memory components, a number of I/O ports, a number of I/O components, and/or a number of power supplies. Additionally any number of these components or combinations thereof may be distributed and/or duplicated across a number of computing devices.

In embodiments, the memories 116 and 124 include computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; or any other medium that can be used to encode information and can be accessed by a computing device such as, for example, quantum state memory, and the like. In embodiments, the memories 116 and 124 store computer-executable instructions for causing the processors 114 and 122, respectively, to perform aspects of embodiments of methods and procedures discussed herein. Computer-executable instructions may include, for example, computer code, machine-useable instructions, and the like such as, for example, program components capable of being executed by one or more processors associated with a computing device. Examples of such program components include the e-reader component 118 and the synchronizer 126. Some or all of the functionality contemplated herein may also be implemented in hardware and/or firmware.

The illustrative operating environment 100 shown in FIG. 1 is not intended to suggest any limitation as to the scope of use or functionality of embodiments of the present invention. Neither should the illustrative operating environment 100 be interpreted as having any dependency or requirement related to any single component or combination of components illustrated therein.

Figure 2:
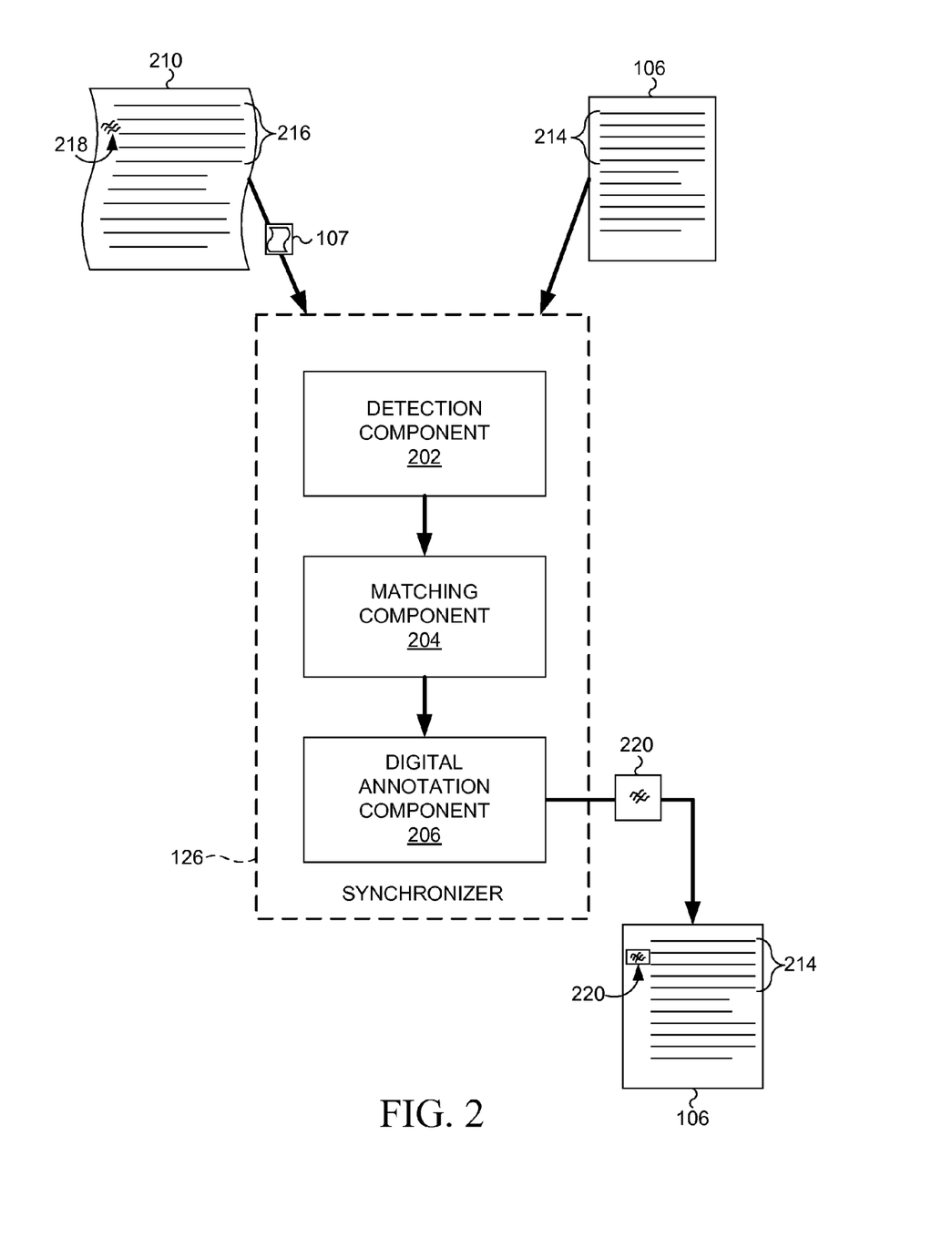
FIG. 2 is a schematic diagram depicting an illustrative operation of a synchronizer in accordance with embodiments of the present invention.

FIG. 2 is a schematic diagram depicting an illustrative operation of the synchronizer 126 in accordance with embodiments of the present invention. As shown in FIG. 2, the synchronizer 126 may include a detection component 202, a matching component 204, and a digital annotation component 206. According to embodiments, any one or more of the components 202, 204, and 206 of the synchronizer 126 depicted in FIG. 2 may share resources with, or be integrated with, various ones of the other components depicted therein (and/or components not illustrated). Additionally, in embodiments, operations of the components 202 and 204 may be performed in any order, cycle, combination, or the like. For example, the matching component 204 may be utilized to identify an electronic document portion that corresponds to a printed document portion prior to utilization of the detection component 202 for detecting an annotation in the printed document portion. Additionally, the detection component 202 may be utilized to detect an annotation in a printed document portion before utilization of the matching component 204 to identify the corresponding electronic document portion into which a corresponding digital annotation is to be inserted. Additionally, any one or more of the components 202, 204, and 206 may reside on the server 102 or the reading device 108, or may be distributed between the server 102 and the reading device 108.

According to embodiments, the detection component 202 detects an annotation 218 in a printed document portion 210. For example, the detection component 202 may receive an image 107 of the printed document portion 210 (e.g., from the memory 124) and may perform one or more procedures to detect the annotation 218. In embodiments, the detection component 202 may also identify an annotation type of the annotation 218. Examples of annotation types include text, highlights, underlines, flags, bookmarks, and the like. Any number of different types of procedures may be used to detect annotations and/or identify annotation types. Examples of such procedures may include handwriting recognition procedures, optical character recognition (OCR) procedures, bitmap comparison procedures, statistical language models, statistical classifiers, neural networks, crowdsourcing, and the like.

For example, the detection component 202 may analyze the image 107 (e.g., by examining pixels or blocks of pixels) to establish patterns associated with the printed text portion 216 and to detect an anomalous feature, or features, that may represent the annotation 218. Examples of such anomalous features may include instances of different colors (e.g., associated with highlighting), instances of irregular shapes and edges (e.g., associated with handwritten notes or underlining), instances of obscured text or geometric shapes having different shades of color (e.g., associated with sticky notes, flags, or bookmarks), and the like. For example, a printed text portion may have been highlighted with a yellow text marker, which may be detected as a yellow feature partially overlapping a printed text portion. In embodiments, the detection component 202 may use statistical techniques to determine a probability that a detected anomaly represents an annotation 218.

According to embodiments, the detection component 202 may detect the annotation 218 in the printed document portion 210 by comparing the image 107 of the printed document portion 210 to at least a portion of the electronic document 106. For example, where the matching component 204 is utilized before the detection component 202, the matching component 204 may provide an indication to the detection component 202 of an electronic text portion 214 that corresponds to the printed text portion 216. The detection component 202 may, for example, access, or create, a bitmap of a corresponding portion of the electronic document 106 and compare that bitmap to a bitmap (e.g., the image 107) of the printed document portion 210 to identify differences between the two bitmaps. A difference in the bitmaps may represent, for example, the presence of the annotation 218 that is not present in the electronic document 106. A difference in the bitmaps may also represent the presence of a digital annotation (not shown) in the electronic document 106 that is not present in the printed document portion 210.

In embodiments, the detection component 202 may utilize an image zoning procedure to partition the image 107 into zones. An image zoning procedure may define one or more text zones corresponding to printed text, and one or more candidate zones corresponding to areas that may include annotations such as, for example, portions of a margin. The image zoning procedure may define a margin as a region that is to the left or right, respectively, of a left-most, or right-most, text zone. In embodiments, a text zone may also be a candidate zone. A handwriting recognition process may be applied to a zone in an attempt to recognize handwriting. If the handwriting recognition process is successful in recognizing handwriting within the zone, the detection component 202 may identify the recognized handwriting as an annotation. Recognizing handwriting may include converting the handwriting into searchable electronic text, which can be inserted into the electronic document as a direct digital annotation.

In embodiments, a portion of handwriting may not be recognizable by the handwriting recognition procedure or the zone may not include handwriting, and, as a result, the handwriting recognition procedure may be unsuccessful in recognizing handwriting. Additionally, a handwriting recognition procedure may be unavailable or impractical (e.g., due to memory constraints). In such cases, other types of analysis may be performed on the zone to determine whether it contains unrecognizable handwriting or other types of annotations. For example, an OCR procedure may be applied to attempt to identify annotations within the zone (e.g., by labeling detected features within the zone that are not able to be mapped to a textual character by the OCR procedure), as described in further detail below with reference to FIG. 5. In embodiments, a region detection procedure may be used to identify regions of consistent color overlaying, or adjacent to, detected printed text, which may facilitate identification of highlighting, underlining, and the like. Any number of statistical classifiers, heuristics, neural networks, and the like may be utilized to detect annotations and tools such as these may be periodically or continually enhanced using machine-learning techniques. As indicated above, the detection component 202 also may determine the type of annotation 218 that it detects. For example, the detection component 202 may determine that a detected annotation 218 in the printed document portion 210 is of a particular annotation type based, at least in part, on look-up tables, characteristics of the annotation 218, feedback from a reviewer, output from classifiers, and the like.

As indicated above, the matching component 204 is configured to access at least a portion of an image 107 of a printed document portion 210 from a memory (e.g., memory 124 shown in FIG. 1) and to access at least a portion of an electronic document 106 from a memory. The matching component 204 identifies an electronic text portion 214 in the electronic document 106 that corresponds to (e.g., is textually similar to) a printed text portion 216 in the printed document portion 210. The matching component 204 may utilize algorithms incorporating OCR techniques, parsing techniques, and/or the like, to identify an electronic text portion 214 that is textually similar to a printed text portion 216.

In embodiments, an electronic version 106 of a printed document may not include identical text to that of the printed document. For example, a printed text portion 216 may include a passage of text and three corresponding footnotes, while the corresponding electronic text portion 214 may include the passage of text and four corresponding footnotes (e.g., the fourth footnote may discuss a recently-decided case) where, e.g., the electronic version is a more recent edition of the document. To facilitate identification of corresponding text portions in a manner that takes into account textual variances such as these, algorithms utilized by the matching component 204 may be configured to evaluate textual similarities between the text portions 214 and 216. As stated previously, textual similarity may refer to a degree of overlap between recognized (e.g., via OCR) characters in the printed text portion 216 and characters in the electronic text portion 214. For example, the matching component 204 may use n-gram searching techniques to identify a set of lines of an electronic document 106 that includes the largest number of n-grams that match n-grams of the recognized text of the printed text portion 216. In embodiments, the matching component 204 may utilize any number of statistical matching techniques to evaluate textual similarity.

Figure 3:
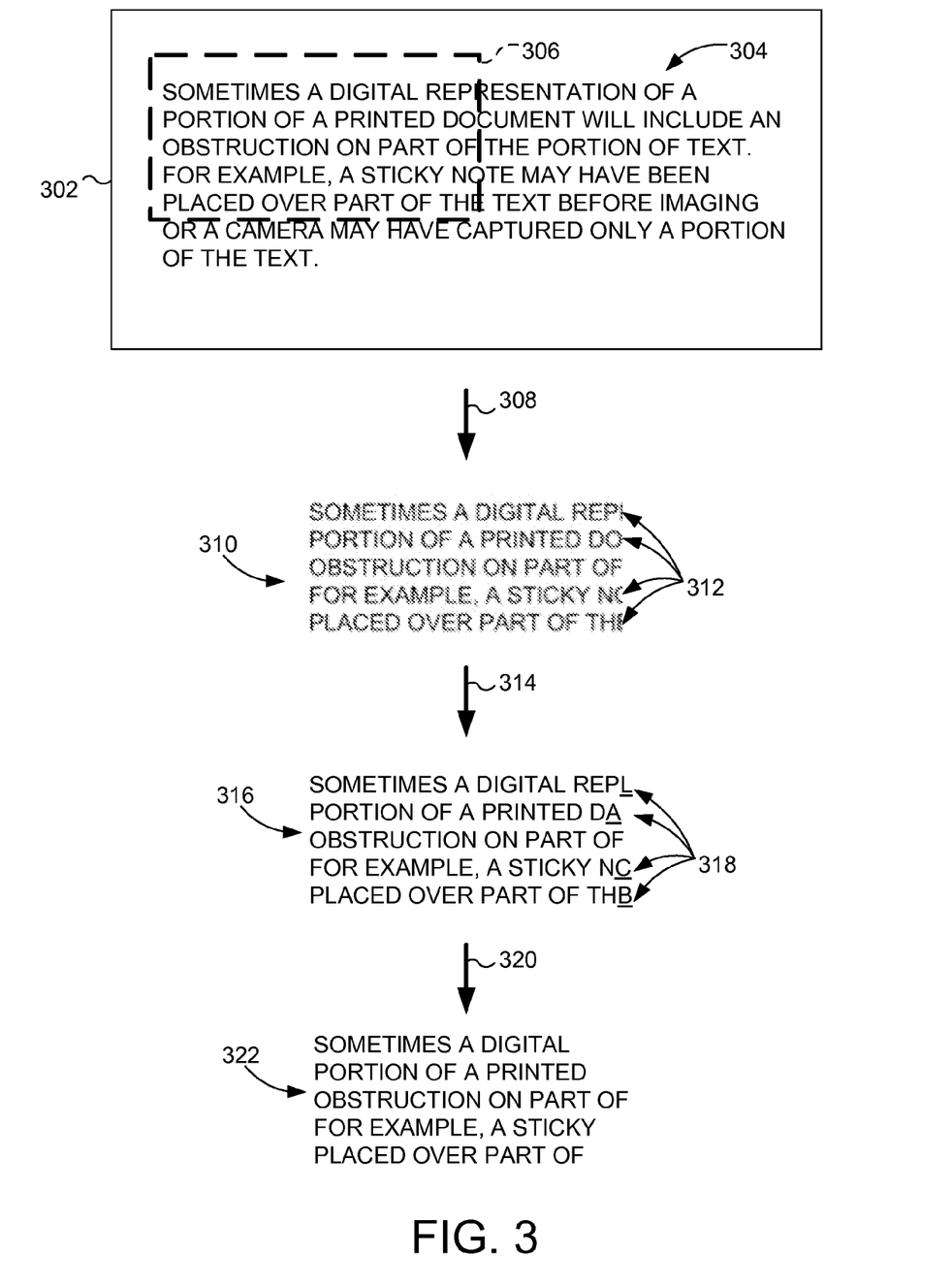
FIG. 3 is a schematic diagram depicting an illustrative pruning operation in accordance with embodiments of the present invention.

In some cases, the printed text portion 216 may include only portions of words and/or characters. For example, the image 107 may be captured in such a way that the entire printed document portion 210 is not captured within the image 107, or a sticky note or other object may obscure part of the printed text portion 216 when the image 107 is captured. In embodiments, identical matching of text may be complicated by inaccurate character recognition during OCR procedures. According to embodiments, the matching component 204 may utilize character pruning techniques to facilitate evaluation of textual similarities between the text portions 214 and 216. Turning briefly to FIG. 3, a portion 302 of a printed document is illustrated having a printed text portion 304. When a user captures a region 306 of the printed document portion 302 using an imaging device, the captured region 306 may include only part of the printed text portion 304, as illustrated. When the captured region 306 is digitized 308 to create an image 310, the image 310 may include incomplete text lines, words, or characters. For example, as shown in FIG. 3, the illustrated image 310 includes partial words 312, some of which include partial characters. When the image 310 is processed 314 using an OCR procedure, the resulting recognized electronic text 316 may include recognition errors 318 (illustrated as underlined characters). The character sequences (e.g., partial words) that include the recognition errors 318 may not be able to be precisely matched to entries in an OCR dictionary and may potentially reduce the efficiency and/or effectiveness of the matching procedure. In embodiments, suffix arrays, regular expression matching (e.g., using wildcard characters) and/or approximate string matching methods (e.g., Edit Distance algorithms) may be utilized to interpret the character sequences containing the recognition errors 318.

Additionally, embodiments of the invention include removing 320 the character sequences containing the recognition errors 318 to create pruned recognized electronic text 322. The pruned recognized electronic text 322, which includes the recognized electronic text 316 without the recognition errors 318, may be used to facilitate a matching procedure. The matching procedure may involve evaluating textual similarity (rather than identity) and, thus, a portion of recognized text that has been pruned may still be useful in identifying a corresponding electronic text portion. For example, one or more search queries may be used to search the electronic document for corresponding electronic text portions, and may result in retrieval of electronic text portions that are ranked so as to enable one or more of them to be identified as corresponding electronic text portions. Identification of corresponding electronic text portions may be further facilitated, using crowd-sourcing models, by presenting one or more retrieved electronic text portions (e.g., the top-ranked retrieved electronic text portions, electronic text portions with similar ranking, or the like) to a reader or reviewer, and soliciting input from the reader or reviewer that may be used to identify or confirm the corresponding electronic text portion. Crowd-sourcing may also be used for correction of OCR recognition errors. For example, the character sequences containing the recognition errors 318 (and, in embodiments, surrounding character sequences) may be provided to reviewers, who may verify the OCR interpretation or provide suggestions for correct interpretation of the character strings.

According to embodiments of the invention, the matching component 204 may utilize various procedures, classifiers, and the like, for determining which parts of a recognized text portion to prune. For example, recognition errors may appear near the boundaries of a recognized text portion and recognized words near one or more of the boundaries that are not found in the OCR dictionary may be pruned. Additionally, the image of the printed document portion can be analyzed to determine which regions of the image include printed text, which may also be useful in facilitating pruning procedures.

Returning to FIG. 2, the synchronizer 126 may include a digital annotation component 206 that facilitates insertion of a digital annotation 220 into the electronic document 106 (or into a copy 104 thereof). Inserting a digital annotation 220 into an electronic document 106 or copy 104 may include, for example, inserting electronic text (e.g., as a direct digital annotation provided by a reader, as a migrated digital annotation, or the like), adding code corresponding to the digital annotation 220 to an extensible markup language, associating an annotation file with an electronic document file, embedding the digital annotation 220 within an electronic document file, or the like. The digital annotation component 206 may facilitate insertion of the digital annotation 220 by inserting the digital annotation 220 into the electronic document 106 (and/or a copy 104 thereof), which may then be provided to the reading device 108.

According to embodiments, the digital annotation component 206 inserts the digital annotation 220 by accessing the electronic text of the electronic document using an application programming interface (API). For example, the digital annotation component 206 may insert a digital annotation into a pdf document using the Adobe® Developer's API, available from Adobe Systems, Inc, of San Jose, Calif. The digital annotation 220 may be inserted into an HTML-based electronic document by providing an HTML overlay or by providing a metadata file or schema and by inserting, into the HTML file, a pointer to the metadata file or schema. The digital annotation 220 may be generated using a handwriting recognition procedure and may be inserted into the electronic document as searchable electronic text. Additionally, the digital annotation component 206 may facilitate insertion of the digital annotation 220 by providing the digital annotation 220 to the e-reader component 118, which inserts the digital annotation 220 into the copy 104 of the electronic document 106. The digital annotation component 206 may provide an instruction that is communicated to the e-reader component 118 and that causes the e-reader component 118 to insert the digital annotation 220 into the copy 104 of the electronic document 106.

Figure 4:
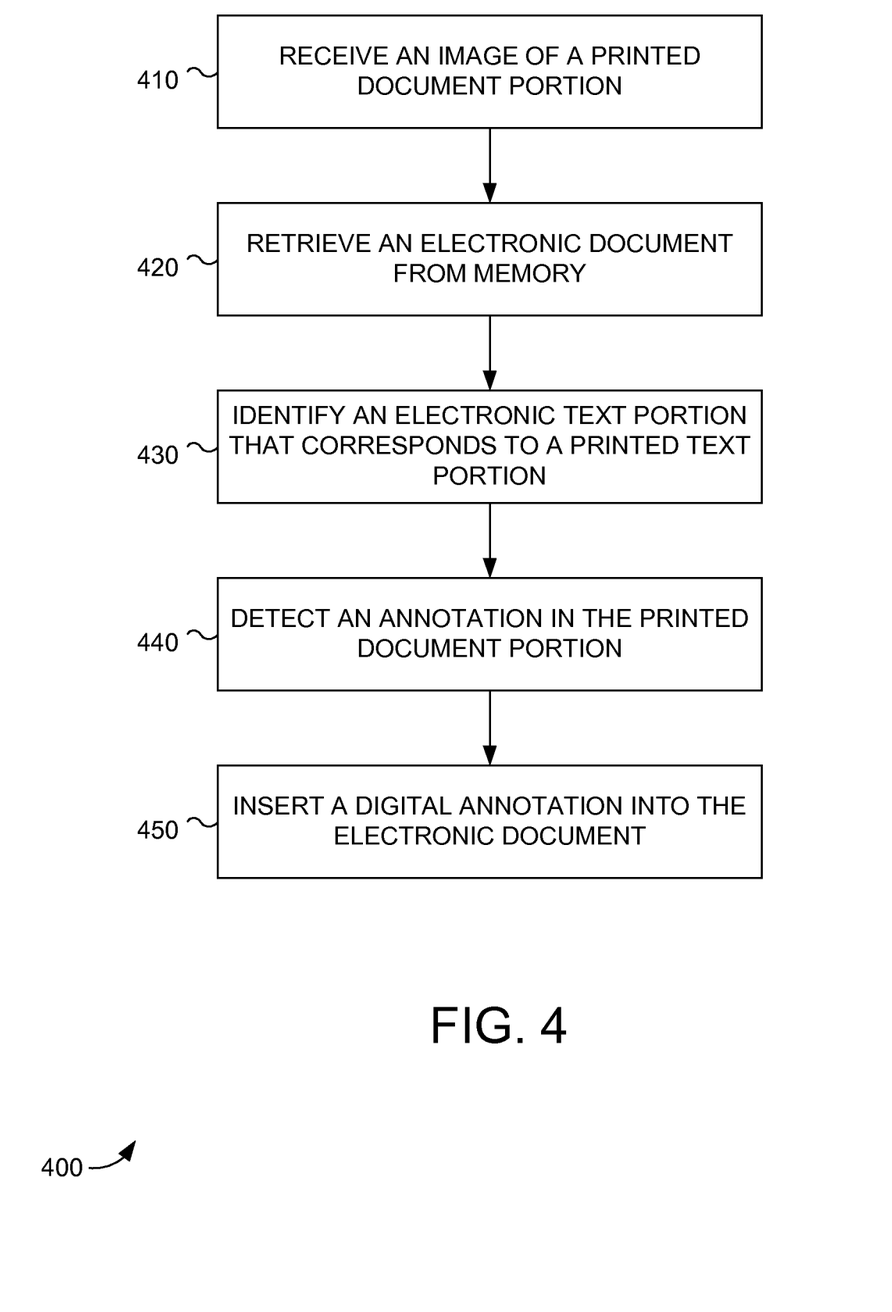
FIG. 4 is a flow diagram depicting an illustrative method of synchronizing annotations between a printed document and an electronic document in accordance with embodiments of the present invention.

As described above, a synchronizer may facilitate navigation of an electronic document and/or synchronization of annotations between a printed document and an electronic document. FIG. 4 is a flow diagram depicting an illustrative method 400 of synchronizing annotations between a printed document and an electronic document, in accordance with embodiments of the present invention. Embodiments of the method 400 include receiving an image of a printed document portion (block 410). The printed document portion may include an annotation in proximity to a printed text portion. A synchronizer (e.g., synchronizer 126 shown in FIG. 1) may receive the image from a reading device (e.g., reading device 108 shown in FIG. 1), a scanning device (e.g., scanning device 130 shown in FIG. 1), or the like, and may store the image in a memory (e.g., memory 124 shown in FIG. 1).

The synchronizer may retrieve the image and an electronic document from the memory (block 420). The synchronizer may use language-modeling techniques, OCR, or the like to identify the electronic document that corresponds to the printed text portion. This may include using a language classifier to determine the language in which the book is written. In embodiments of the method 400, the synchronizer identifies an electronic text portion within the electronic document that corresponds to the printed text portion (block 430). For example, the synchronizer may include a matching component (e.g., matching component 202 shown in FIG. 2) that identifies an electronic text portion that is textually similar to the printed text portion. The matching component may perform a search within the electronic document, in which lines of the printed text portion are phrasal queries that are applied against an indexed form of the electronic document. The indexed electronic document may include, for example, suffix arrays. Multiple phrasal queries leading to top-ranked retrieval results may be used to identify the corresponding electronic text portion.

Embodiments of the method 400 also include detecting an annotation in the printed document portion (block 440). For example, a detection component (e.g., detection component 204 shown in FIG. 2) may detect the annotation by analyzing an image of the printed document portion. Annotations may be detected using OCR procedures, handwriting recognition procedures, classifiers, or a combination of these, as described in more detail below, with reference to FIG. 5. As shown in FIG. 4, a digital annotation, corresponding to the detected annotation, is inserted into the electronic document and/or a copy of the electronic document (block 450). As described above, the digital annotation may be inserted into the electronic document by the synchronizer, or may be inserted into a copy of the electronic document by an e-reader component (e.g., e-reader component 118 shown in FIG. 1). The digital annotation may be inserted in proximity to the corresponding electronic text portion at a location that at least substantially corresponds to the location of the detected annotation in the printed document portion.

Figure 5:
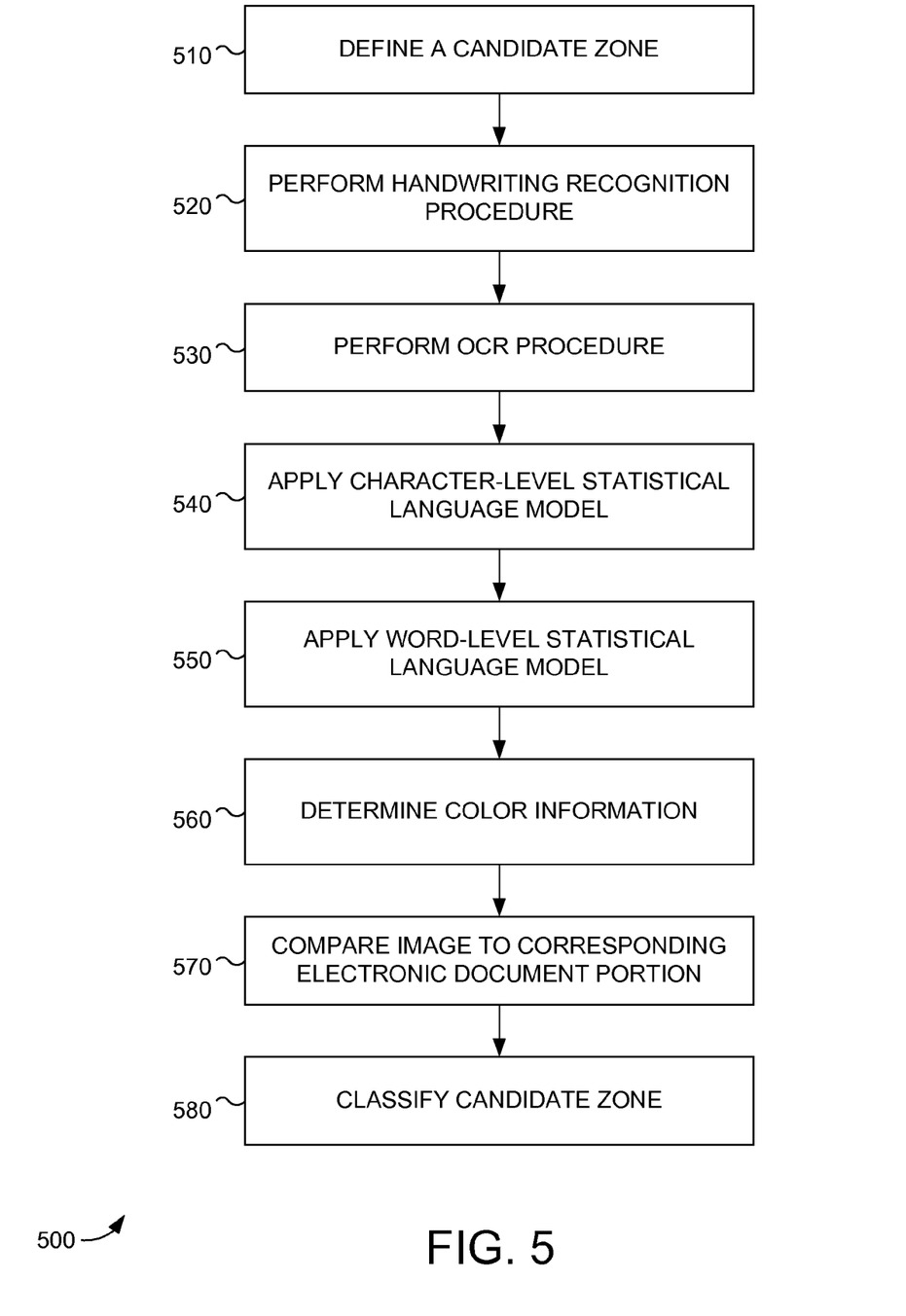
FIG. 5 is a flow diagram depicting an illustrative method of detecting annotations in a printed document portion in accordance with embodiments of the present invention.

FIG. 5 is a flow diagram depicting an illustrative method 500 of detecting an annotation in a printed document portion by analyzing an image of the printed document portion, in accordance with embodiments of the present invention. Embodiments of the illustrative method 500 include defining a candidate zone (block 510), e.g., by partitioning the image into a number of zones, which may include text zones, candidate zones, and the like. In some cases, text zones may also be candidate zones (e.g., where annotations may be present in or between lines of printed text). A detection component (e.g., detection component 204 shown in FIG. 2) may partition the image into zones based on a geometric (e.g., rectangular) pattern, regions of the image containing consistent features, or the like. One or more statistical classifiers may be applied to distinguish between regions of the image that are more likely to include printed text and regions that are more likely to contain annotations. Embodiments of the invention then include performing one or more of the following steps (520-580) for each defined zone.

Embodiments of the method 500 include performing a handwriting recognition procedure (block 520) on a candidate zone, which may, for example, be utilized to detect handwritten annotations in the candidate zone. Additionally, handwritten text in text zones (e.g., between lines of printed text) may be identified using classifiers that distinguish between handwriting and printed text. Examples of such classifiers include support vector machine (SVM) classifiers, k-nearest neighbor (K-NN) classifiers, Fischer discriminators, neural networks, minimum distance classifiers, and the like.

An OCR procedure may be performed on the candidate zone (530). The OCR procedure may be used to extract features from the candidate zone, and to determine if the extracted features are associated with printed text. If the OCR procedure does not result in detecting any printed text, an inference may be made that the candidate zone may contain annotations. Similarly, if the OCR procedure detects printed text in only a part of the candidate zone, an inference may be made that other parts of the candidate zone may contain annotations. The OCR procedure may include, for example, feature extraction, matrix matching, or a combination of these.

Embodiments of the method 500 include applying a character-level statistical language model (block 540) to features extracted by the OCR procedure. The character-level statistical language model may be used to calculate a probability that an extracted feature includes a character string that is typical of a particular language, e.g., $P(s_c)$, where $s_c$ is a character sequence. Additionally, a word-level statistical language model (block 550) may be applied to extracted features and may, for example, be used to calculate a probability that an extracted feature includes a word sequence typical of a particular language, e.g., $P(s_w)$, where $s_w$ is a word sequence. The language models may be applied to facilitate determining whether the extracted features likely are associated with printed text.

Embodiments of the method 500 further include determining color information associated with the candidate zone (block 560). For example, the image of the printed document portion may be a color photograph and the detection component may analyze the photograph to identify each pixel that includes a color (e.g., other than black or white), the color of each pixel, characteristics of pixel colors (e.g., hue, saturation, intensity), and the like. In this manner, for example, regions of color in a candidate zone may be detected and used to facilitate detection of an annotation and/or identification of an annotation type corresponding to a detected annotation. For example, a relatively square region of yellow pixels in a candidate zone defined in a margin may be identified as a yellow sticky note, whereas a narrower rectangular region of pink pixels in a text zone may be identified as highlighting. Supervised machine-learning methods may be used to distinguish between different kinds of annotations (e.g., sticky notes versus handwritten marginal notes versus green text marker highlighting).

Embodiments of the method 500 further include comparing the image to a corresponding electronic document portion (block 570). A bitmap of the image may be compared to a bitmap of the corresponding electronic document portion to evaluate differences between the pixels of the two bitmaps. For example, a detection component may overlay the image bitmap on the electronic document portion bitmap and reorient the overlaid bitmaps until a minimum number of overlap pixel differences are obtained. The pixel differences that remain (e.g., pixels that appear in the image bitmap that do not also appear in the electronic document bitmap or vice-versa) may represent annotations. Additionally, noise thresholds may be utilized to ignore small differences (e.g., 1 or 2 disconnected pixels) that may represent, for example, dust particles, camera lens blemishes, or the like. As with any of the other procedures described herein, the bitmap comparison procedure may be enhanced using machine-learning techniques.

Embodiments of the method 500 include classifying the candidate zone (block 580). For example, a binary statistical classifier may be utilized to classify the candidate zone as either containing an annotation or not. The classifier may consider input features such as information generated from one or more of the steps of embodiments of method 500 described above such as, for example, $P(s_c)$, $P(s_w)$, color information, bitmap overlay pixel differences, the dimensions of the candidate zone, and the position of the candidate zone with respect to a margin of the printed page. For example, the classifier may take, as inputs, x, y, w, and h, where x is the horizontal distance of the candidate zone from the margin of the page, y is the vertical distance of the candidate zone from the margin of the page, w is the width of the candidate zone, and h is the height of the zone, all of which may be determined during partitioning. In embodiments, the classifier may take, as input, any number of different types of information in addition to, or in lieu of, those discussed above. Additionally, the classifier may be trained, using any number of machine-learning techniques, to enhance its ability to classify zones. Examples of features that may be used to train the classifier include color, hue, saturation, underlining, handwriting, fonts, margin positions, pixel noise, and the like.

While embodiments of the present invention are described with specificity, the description itself is not intended to limit the scope of this patent. Rather, the inventors have contemplated that the claimed invention might also be embodied in other ways, to include different steps or features, or combinations of steps or features similar to the ones described in this document, in conjunction with other technologies.

The following is claimed:

1. A computer-implemented method for synchronizing annotations between a printed document and an electronic document, the method comprising:
   receiving, at a server, an image of a printed document portion having a printed text portion, wherein the printed document portion includes an annotation in proximity to the printed text portion;
   accessing at least a portion of the electronic document from a memory device, wherein the electronic document comprises an electronic version of the printed document;
   identifying an electronic text portion within the electronic document that corresponds to the printed text portion;
   detecting the annotation in the printed document portion;
   facilitating insertion of a digital annotation into at least one of the electronic document and a copy of the electronic document, the digital annotation corresponding to the detected annotation, wherein the digital annotation is inserted in proximity to the identified electronic text portion at a location that at least substantially corresponds to a location of the detected annotation in the printed document portion;
   identifying an additional digital annotation in the electronic document;
   determining, by analyzing the image of the printed document portion, that the printed document portion does not include an additional annotation corresponding to the additional digital annotation;
   determining whether the additional digital annotation is a migrated annotation or a direct digital annotation, wherein a migrated annotation is an annotation inserted during a synchronization process to correspond to an annotation in a printed document, and wherein a direct digital annotation is an annotation added directly to an electronic document by a reader; and
   removing the additional digital annotation from the electronic document if the additional digital annotation is a migrated annotation, wherein the additional digital annotation is not removed if the additional digital annotation is a direct digital annotation.

2. The method of claim 1, wherein determining whether the additional digital annotation is a migrated annotation or a direct digital annotation comprises determining a value of a tag associated with the additional digital annotation.

3. The method of claim 1, further comprising:
identifying an annotation type of the detected annotation, wherein the annotation type comprises at least one of a highlight, a handwritten text, an underline, and a flag, and wherein facilitating insertion of the digital annotation into the electronic document comprises creating a digital annotation of the identified annotation type.

4. The method of claim 1, wherein facilitating insertion of the digital annotation in the electronic document comprises inserting electronic text into a margin of the electronic document.

5. The method of claim 1, wherein the electronic document comprises a platform-independent document format.

6. The method of claim 1, wherein identifying the corresponding electronic text portion comprises identifying a textual similarity between the printed text portion and the corresponding electronic text portion.

7. The method of claim 6, wherein identifying the textual similarity comprises:
recognizing a part of the printed text portion by performing an optical character recognition (OCR) procedure on the image of the printed document portion;
converting the recognized part of the printed text portion to recognized electronic text using the OCR procedure;
identifying at least one character sequence in the recognized electronic text that includes a recognition error;
creating pruned recognized electronic text, wherein the pruned recognized electronic text comprises the recognized electronic text from which the at least one character sequence has been removed; and
searching the electronic document using at least one search query that comprises the pruned recognized electronic text.

8. One or more non-transitory computer-readable media having computer-executable instructions embodied thereon for facilitating synchronization of annotations between a printed document and an electronic document, wherein the instructions include a synchronizer having a plurality of program components, the plurality of program components comprising:
a matching component that (1) receives an image of a printed document portion having a printed text portion and (2) identifies an electronic text portion within the electronic document that corresponds to the printed text portion; and
a digital annotation component that facilitates insertion of a digital annotation into the electronic document in proximity to the identified corresponding electronic text portion;
wherein the synchronizer is further configured to:
identify an additional digital annotation in the electronic document;
determine, by analyzing the image of the printed document portion, that the printed document portion does not include an annotation corresponding to the additional digital annotation;
determine whether the additional digital annotation is a migrated annotation or a direct digital annotation, wherein a migrated annotation is an annotation inserted during a synchronization process to correspond to an annotation in a printed document, and wherein a direct digital annotation is an annotation added directly to an electronic document by a reader; and
remove the additional digital annotation from the electronic document if the additional digital annotation is a migrated annotation, wherein the additional digital annotation is not removed if the additional digital annotation is a direct digital annotation.

9. The media of claim 8, wherein the matching component utilizes an optical character recognition (OCR) procedure to recognize the printed text portion within the printed document portion, and wherein the matching component utilizes one or more search queries to identify the corresponding electronic text portion.

10. The media of claim 9, wherein the matching component utilizes a pruning procedure to remove recognition errors from the recognized printed text portion.

11. The media of claim 8, further comprising:
a detection component that detects an annotation in the printed document portion by analyzing at least the image of the printed document portion, wherein the printed document portion includes the annotation in proximity to the printed text portion.

12. The media of claim 11, wherein the detection component partitions the image of the printed document portion into a plurality of zones, the plurality of zones comprising at least one text zone and at least one candidate zone.

13. The media of claim 12, wherein the detection component analyzes the at least one candidate zone using at least one of a handwriting recognition procedure, an OCR procedure, a statistical language model, a bitmap overlay comparison, and a statistical classifier.

14. The media of claim 11, wherein the detection component detects the annotation based, at least in part, on feedback received from at least one reviewer via a crowdsourcing platform.

15. A system that facilitates synchronization of annotations between a printed document and an electronic document, the system comprising:
a server configured to receive, from an imaging device, an image of a printed document portion having a printed text portion, the server comprising a processor configured to instantiate a synchronizer configured to:
(a) identify a corresponding electronic text portion in the electronic document, wherein the corresponding electronic text portion is textually similar to the printed text portion,
(b) identify a digital annotation in the electronic document,
(c) determine, by analyzing the image of the printed document portion, that the printed document portion does not include an annotation corresponding to the digital annotation,
(d) determine whether the digital annotation is a migrated annotation or a direct digital annotation, wherein a migrated annotation is an annotation inserted during a synchronization process to correspond to an annotation in a printed document, and wherein a direct digital annotation is an annotation added directly to an electronic document by a reader, and
(e) remove the digital annotation from the electronic document if the digital annotation is a migrated annotation, wherein the additional digital annotation is not removed if the additional digital annotation is a direct digital annotation.

16. The system of claim 15, wherein the synchronizer is configured to:
- (f) detect an annotation in the printed document portion by utilizing at least one of a handwriting recognition procedure, an OCR procedure, a statistical language model, a bitmap overlay comparison, and a statistical classifier; and
- (g) facilitate insertion of an additional digital annotation into the electronic document, wherein the additional digital annotation corresponds to the detected annotation.

17. The system of claim 16, wherein the synchronizer is configured to facilitate insertion of the digital annotation into the electronic document by (1) associating a metadata file containing the annotation with the electronic document, and (2) inserting a pointer to the metadata file into the electronic document.

18. The system of claim 15, wherein the imaging device comprises at least one of a camera disposed in a reading device and an industrial scanning device.

* * * * *